United States Patent [19]

Agnew et al.

[11] Patent Number: 5,291,002
[45] Date of Patent: Mar. 1, 1994

[54] SYSTEM FOR GENERATING MACHINE READABLE CODES TO FACILITATE ROUTING OF CORRESPONDENCE USING AUTOMATIC MAIL SORTING APPARATUS

[75] Inventors: Edward G. K. Agnew, Campbellville; Udo H. Mohaupt, Cambridge; Oscar G. Nespoli, Guelph, all of Canada

[73] Assignee: Z Mark International Inc., Markham, Canada

[21] Appl. No.: 62,648

[22] Filed: May 17, 1993

Related U.S. Application Data

[63] Continuation of Ser. No. 544,783, Jun. 27, 1990, abandoned.

[30] Foreign Application Priority Data

Jun. 28, 1989 [GB] United Kingdom ............... 8914838

[51] Int. Cl.⁵ .................... G06K 1/12; G06K 7/10
[52] U.S. Cl. ................... 235/375; 235/432; 209/900
[58] Field of Search ........... 209/3, 3.2, 3.3, 583, 209/584, 900; 364/464.02; 235/375, 432, 454, 462, 475, 476, 479

[56] References Cited

U.S. PATENT DOCUMENTS

| | | | |
|---|---|---|---|
| 3,587,856 | 6/1971 | Lemelson | 209/584 |
| 4,158,835 | 6/1979 | Miura et al. | 209/900 |
| 4,306,817 | 12/1981 | Alas | 400/103 |
| 4,871,903 | 10/1989 | Carrell | 235/375 |
| 4,940,887 | 7/1990 | Sheng-Jung | 236/375 |
| 4,992,649 | 2/1991 | Mampe et al. | 235/375 |

FOREIGN PATENT DOCUMENTS 0076972 4/1983 European Pat. Off. .
0550618 1/1943 United Kingdom .
2193160 2/1988 United Kingdom .

Primary Examiner—Robert A. Weinhardt
Attorney, Agent, or Firm—Bereskin & Parr

[57] ABSTRACT

The method of the present invention is intended to facilitate routing of correspondence to a destination address by automatic mail sorting apparatus comprising the steps:
(a) marking a letter with an easily machine readable first code corresponding to the human readable postal code of the destination address;
(b) stuffing the letter into a window envelope such that the first code is positioned within the window;
(c) machine reading the first code within the window; and
(d) printing a machine readable second code corresponding to the first code and the human readable postal code of the destination address in the location and format utilized by a particular automatic mail sorting apparatus such that the envelope is suitable for processing by the apparatus. The apparatus of the present invention includes a conveyor track for passing window envelopes through a read station and a print station. At the read station, an optical sensor reads the first code, in the form of printed marks signifying the postal code, through the window, the information being passed to a computer. At the print station, the second code, in the form of fluorescent or other marks are placed on the envelope, as instructed by the computer.

23 Claims, 10 Drawing Sheets

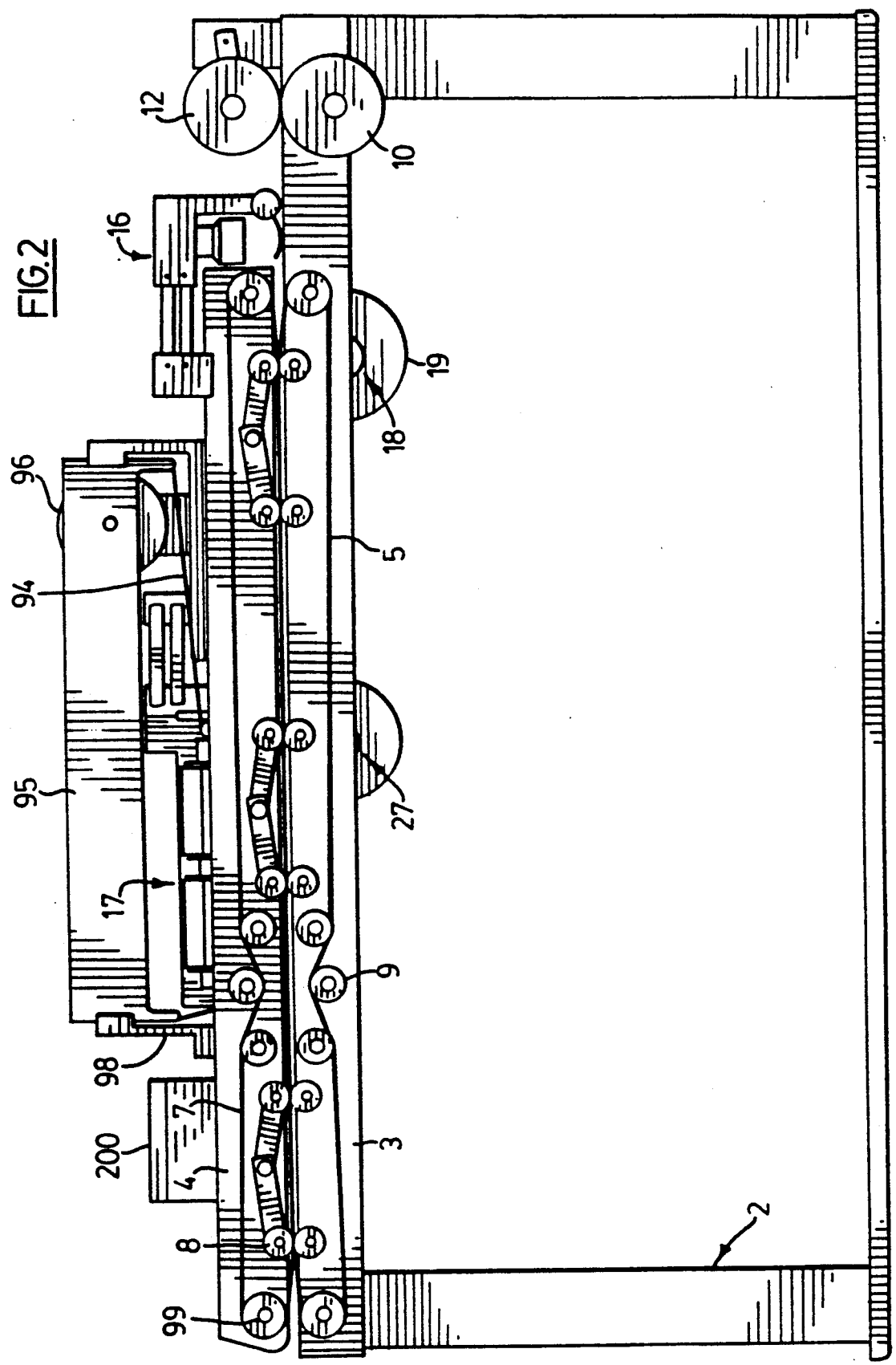

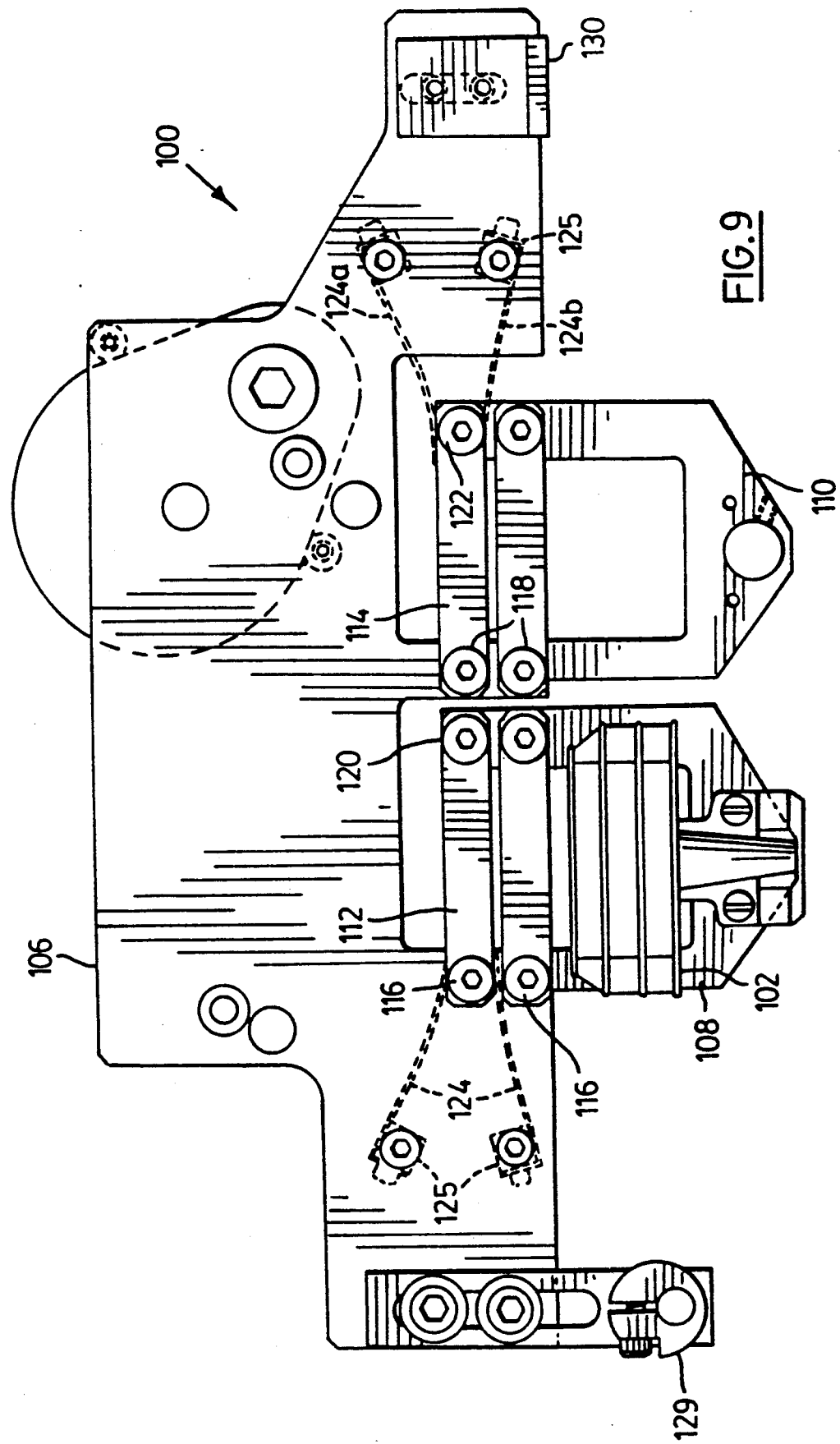

SYSTEM FOR GENERATING MACHINE READABLE CODES TO FACILITATE ROUTING OF CORRESPONDENCE USING AUTOMATIC MAIL SORTING APPARATUS

This application is a continuation of Ser. No. 07/544,783, filed Jun. 27, 1990, now abandoned.

FIELD OF THE INVENTION

This invention relates to the printing of machine readable markings on envelopes, for use in automatic postal sorting and similar machinery.

BACKGROUND OF THE INVENTION

It is the practice of postal authorities to print machine-readable markings on envelopes which pass through the postal system, to signify a particular sorting or delivery code.

One common practice is that at the sorting office the envelope passes through a station at which the envelope is visually presented to a clerk; the clerk reads the postal code written by the sender on the outside of the envelope, and then presses the appropriate keys to print a corresponding machine readable code, for example a series of bars, typically of fluorescent ink, on the envelope. In the case of window envelopes, the clerk reads the postal code as written on the item of correspondence that lies inside the envelope, and again presses the keys to print the bars.

Thereafter, the bars can be detected automatically; consequently, once the bars have been printed on the envelope, the envelope need not be handled by post office personnel again until it is actually delivered.

Fluorescent ink, as opposed to ordinary ink, is specified by many national Post offices for the markings that are to be detected automatically, to make sure that only the markings themselves are read by the automatic detectors. In practice, there is generally no way in which spurious fluorescent markings could appear by accident, and be detected, on the envelopes. However, some national Post Offices specify, for example, black ink.

The task of manually reading the postal codes, and manually keying-in the appropriate markings, is tedious, and requires a high degree of concentration on the part of the coding clerk. Also, processing time is relatively slow, such that a large number of clerks are required where mail volumes are high, contributing significantly to post office labour costs. Equipment for the machine-reading of postal codes is in common use, at least where the codes are printed or typewritten. The equipment can respond to ordinary alpha-numeric characters. The degree of accuracy of such equipment however is only fair, and it is still necessary to employ clerks to process the many "rejects" that the equipment cannot read.

With window envelopes, the problem of correctly detecting and reading the characters through the window is worse, and consequently the accuracy to be expected from the traditional equipment falls still further.

It is the high-volume user with which the invention is mainly concerned, in which the user sends out, for example, a million items per month, all of a similar nature. A typical example would be a bank which issues credit card statements. In a number of jurisdictions, savings in postal rates are available if the envelopes in which these statements are sent can be printed, in-house, with the machine-readable code, representative of the particular postal code, as this eliminates a mail processing step at the post office. Although savings per piece of mail may be small, high-volume users may achieve significant savings in postal charges.

Further, the high-volume user, as in the example of a bank which issues credit card statements as described above, desires not to print up the envelope at the time the statement is printed. The high-volume user prefers rather that the envelope be not unique to the particular statement, since attempting to match the envelopes to the letters, especially when other enclosures are required to be inserted into the envelopes in addition to the statements, is difficult. Accordingly, it is preferred to make only the statement unique, and make use of window envelopes. Thus it is not convenient to provide envelopes preprinted with the appropriate machine-readable code.

A number of patent documents were considered in relation to the invention, these patents being listed below:

U.S. Pat. No. 3,895,220
U.S. Pat. No. 4,158,835
U.S. Pat. No. 4,317,030
U.S. Pat. No. 4,641,347
U.S. Pat. No. 4,743,747
U.S. Pat. No. 4,757,189
U.S. Pat. No. 4,821,195
U.S. Pat. No. 4,797,832
U.S. Pat. No. 4,800,504
U.S. Pat. No. 4,800,505
U.S. Pat. No. 4,800,506
U.S. Pat. No. 4,853,869
U.S. Pat. No. 4,862,386
United Kingdom Patent No. 2,193,160
United Kingdom Patent No. 1,486,596
United Kingdom Patent No. 550,618
European Patent No. 0,076,972
U.S. Pat. No. 4,027,142
U.S. Pat. No. 4,306,817

U.S. Pat. No. 3,895,220 to Nelson et al. is entitled SELECTIVELY ENCODABLE ENVELOPE INSERT AND RELATED APPARATUS, and describes a magnetically readable envelope insert provided with bars of magnetized ink located on detachable portions of the insert. The insert may be read while still inside an envelope. The insert has particular application for insertion in reply envelopes, different portions of the insert being detached to indicate certain orders or different methods of payment. For an illustration of this, see, for example, the chart at the bottom of column 3 of the patent.

U.S. Pat. No. 4,158,835, to Miura et al. is entitled ARRANGEMENT FOR DETECTING A WINDOW AREA OF A WINDOW-HAVING MAIL ITEM and describes apparatus for detecting the location of the window area of an envelope using photoelectric detectors.

U.S. Pat. No. 4,317,030 to Berghell, entitled MAILING PACKAGE FOR FACILITATING AUTOMATIC SORTING OF MAIL, relates to the provision of machine readable coded arrays on the exterior of an envelope. The invention has particular application for use with reusable envelopes. When the envelope is sent out, for example from a utility to a customer, the coded arrays are provided by punching apertures corresponding to an address in a sheet and placing a sheet of contrasting colour behind this, such that the contrasting colour of the back sheet is visible through the apertures, and through a window in a containing envelope, and may be read by a sorting machine. When the envelope is returned to the utility, the location of the contrasting sheet of colour is moved such that it lies behind an array of apertures punched in the envelope, such that this array may be read and used to facilitate sorting of the returning mail.

U.S. Pat. No. 4,641,347 to Clark et al. is entitled SYSTEM FOR PRINTING ENCRYPTED MESSAGES WITH A CHARACTER GENERATOR AND BAR-CODE REPRESENTATION, and relates to a postage meter for use in imprinting various information, including a zip code or bar code, on the exterior of an envelope or the like. The information is entered manually by an operator. The main thrust of the disclosed invention appears to be in the prevention of fraud and forgery involving postal stamps.

U.S. Pat. No. 4,743,747 to Fougere et al. is entitled POSTAGE AND MAILING INFORMATION APPLYING SYSTEM and discloses a system for encoding information on an envelope or other piece of mail. The patent discloses the printing of a bar code on a label, directly on an envelope, or in an insert which is visible through a window.

U.S. Pat. No. 4,757,189 to Daboub relates to apparatus for coding re-usable envelopes and discloses a system for manually entering bar codes on the outside of an envelope for internal mailing systems.

U.S. Pat. Nos. 4,821,195, 4,797,832, 4,800,504, 4,800,505, 4,800,506, 4,853,869, and 4,862,388 all relate to bulk mailing systems, in which the information which is printed on the exterior of the envelope is extracted from a data base.

In United Kingdom Patent Application No. 2,193,160, applicant Thorn EMI plc, entitled PRINTER, a unit is disclosed in which means are provided for determining whether an address signal includes a post code. If an post code is detected, an extractor derives the relevant information from a data store, the resultant signal being combined with the address signal at a summer before input to an address writer. The post code is applied to the envelope or label in a phosphor-dot form which is easily machine-readable. The remainder of the address is printed in conventional form. Thus, a multi-mode printer is provided which is capable of printing in alphanumeric script and in machine-readable phosphor-dot code. The printer may be a modified conventional printer and may have an impact printing mechanism (for example, a daisy wheel arrangement) with two ribbons (one for each form of printing), or one ribbon with two bands.

In United Kingdom Patent No. 1,486,596, granted to Hotchkiss Brandt Mecanisation, and entitled CODING HEAD FOR POSTAL ENVELOPES AND A CODING STATION FITTED THEREWITH, discloses apparatus for printing a machine readable postal code on an envelope is disclosed. The system is intended for use in an operation where control signals characteristic of a code marking to be printed are produced as a function of an address read by an operator, who punches into a keyboard the address details and a logic device translates these to the appropriate control signals. The printing head includes an assembly for holding an envelope to be coded in register with a printing ribbon. A plurality of printing bars having parallel printing heads mounted in register with a portion of the inking ribbon are provided, the number of bars being equal to the number of printing coding marks which may be printed. The coding head may be manually fed with individual envelopes by an operator or may be automatically fed to reading position from which the envelope is manually transferred to a coding position.

In United Kingdom Patent No. 550,618, granted to Remington Rand Inc., entitled IMPROVEMENTS IN OR RELATING TO STATISTICAL MACHINES, a machine which reads the information contained in a punched data card, and then prints this information on the same card. The machine discloses a complex mechanical arrangement for sensing the perforations on a punched card, temporarily retaining this information, decoding the information and printing the decoded information onto the card at a different location in the machine.

In

U.S. Pat. No. 4,027,142, to Paup et al, entitled AUTOMATED PROCESSING OF FINANCIAL DOCUMENTS, apparatus for the automatic processing of bank cheques is disclosed. The cheques are encoded with a line of alphanumeric characters and are processed by passing through a first station for generating an item control number unique to each document and a read station for sensing each character in the encoded line to produce a string of data signals for each document. At a print station the control number and other data are imprinted on the back of each document in code form and the control number and other data are imprinted on the face of each document in human readable form. The read station includes an MICR read station, an OCR read station and a bar-code read station. The print station includes a bar code ink jet printer, a bar code indicator, and a dual alphanumeric ink jet printer. The MICR read station serves to read the alphanumeric data encoded in magnetic ink on the bottom of each cheque, while the OCR read station reads the same line of information. This information is merged to produce a single output data stream. The printing of the correct information on each cheque is synchronized by means of a central computer.

In

U.S. Pat. No. 4,306,817 to Alas, entitled BAR CODE PRINTING MECHANISM, there is disclosed the use of two synchronized printing heads, each spaced apart longitudinally for printing one half a bar of, for example, a U.S. postal code. The operation of the forwardmost head is delayed for a period of time sufficient to allow the target object to have moved a distance approximately equal to the spacing between the heads.

SUMMARY OF THE INVENTION

A first aspect of the present invention provides a method of encoding correspondence bearing a human readable postal code to facilitate routing of the correspondence to a destination address by automatic mail sorting apparatus being adapted to use a particular location and format for the destination address, said method comprising the steps: (a) marking a letter with an easily machine readable first code, said first code being generated from and corresponding to the human readable postal code of the destination address; (b) stuffing the letter into a window envelope such that the first code is positioned within the window; (c) machine reading the first code within the window; (d) printing a machine readable second code corresponding to the first code and the human readable postal code of the destination address and the location and format utilized by the particular automatic mail sorting apparatus such that the envelope is suitable for processing by the apparatus This method allows a volume mailer, such as a bank or credit card company sending out monthly statements, to provide pieces of mail for the post office which have already undergone a first process step, that is the marking of a machine readable marking corresponding to the postal code on the exterior of the envelope in a manner which permits automatic sorting of the mail. The marking of the letter with the first code conveniently takes place as the letter is marked with the destination address. Further, the use of window envelopes does not require the matching of a letter or other correspondence with a particular envelope, and substantially simplifies the envelope stuffing operation, allowing this to be carried out with easily available, conventional apparatus.

According to a second aspect of the present invention, there is provided a method of encoding correspondence bearing a human readable postal code to facilitate routing of the correspondence to a destination address by automatic mail sorting apparatus, said method comprising the steps: (a) marking a piece of mail with an easily machine readable first code, said first code being generated from and corresponding to the human readable postal code of the destination address; (b) machine reading the first code; and (c) printing a machine readable second code corresponding to the first code and the human readable postal code of the destination address in a location and format utilized by the particular automatic mail sorting apparatus.

This particular aspect of the invention, not necessarily requiring the use of window envelopes, is advantageous, for example, where a number of envelopes are to be sent to various different destination addresses with the same enclosures, or where a number of similar postcards are to be sent to different destination addresses.

A further aspect of the invention provides an apparatus for printing coded markings an apparatus for printing coding markings on an envelope, in accordance with machine readable pre-printed marks relating to a human readable destination address on a piece of correspondence, said apparatus comprising: (a) a read station and a print station, and a conveyor for transporting the envelope there between, along a conveyor line; (b) means for determining displacement of the envelope along said conveyor line and for producing signals indicative of said displacement; (c) the read station including an optical sensor, which is effective to produce a series of electrical signals in response to reading the machine readable pre-printed marks; (d) computing means coupled to said read and print stations, which accepts signals of displacement of the envelope through the stations and controls the read and print stations; (e) means for transmitting said electrical signals from the optical sensor to the computing means; (f) means for producing a sequence of spaced pulses from said electrical signals, said computing means transmitting said pulses to said print station; (g) said print station including at least one signal-control printer, which, during normal operation of the apparatus, remains at a fixed print-point at the print station; (h) and the printer being effective to print a marking on the envelope as the envelope passes said print-point and to print a series of such markings on the passing envelope in spaced-apart sequence in accordance with the pulses received from the computing means; (i) said means for determining displacement of the envelope including a print station displacement counter at said print station, and a read station displacement counter at said read station, each of said displacement counters being coupled to said computing means and generating said signal indicative of the displacement of a passing envelope relative to each respective station, and said computing means utilizing said displacement for controlling said read and print stations; (j) each of said displacement counters comprising a transducer, said transducers producing said signals corresponding to the displacement of a passing envelope, and said computing means including means for correlating said displacement signals with said electrical signals received from said optical sensor, the correlation is such as to insure that the spacing and positioning of the coding markings printed on the envelope by the printer correspond to the pre-printed marks as read by the optical sensor; (k) wherein the envelope has a window, and the pre-printed marks are upon the item of correspondence readable through the window, and the window has a leading edge; and (l) the apparatus includes a means for disabling electrical signals from the optical sensor, in respect of a particular passing envelope until after the leading edge of the window of that envelope has passed the optical sensor.

The print station includes at least one signal-controlled printer, which, during normal operation of the apparatus, remains at a fixed print point at the print station.

In one aspect of the invention, the computing means accepts signals of displacement of the passing envelope from the print station and the read station, and coordinates these displacements with the signals from a read head, whereby the printer is effective to print a mark on the envelope as the envelope passes the said print station, and to print a series of such marks on the passing envelope in spaced-apart sequence in accordance with the said spaced pulses.

Preferably, each station is provided with a revolution counter, or angular-displacement indicator, which is set to engage with the passing envelope, whereby the linear displacement of the passing envelope corresponds to the angular displacement of the counter.

One of the difficulties with reading printed markings through a window is that the read sensor tends to read the edge of the window as one of the markings. The first aspect of the invention is described as it relates to its application to window envelopes, but it should be noted that the said difficulty can arise also in the case where the markings to be read are printed on a stick-on label, wherein the read sensor has a tendency to detect the edge of the label as if it were one of the markings. The scope of the invention should be construed accordingly. As will be described presently, the first aspect of the invention allows the read sensor to read the markings clearly and accurately, with a good deal of tolerance, and yet enables the read sensor to ignore the edge of the window, or the edge of the label.

In a preferred construction, for use with window envelopes, at the read station a read head is provided with a photo-detector. The photo-detector scans the window of a passing envelope, and detects the presence of a bar printed on the item of correspondence inside the envelope, and visible through the window.

The window of a window-envelope is, as a general rule, provided with a pane of transparent material, such as cellophane, and the read head must detect the presence of the bars through the transparent material. A springy slipper is preferably provided, for the purpose of smoothing the pane down flat unto the item of correspondence.

The thickness of the envelopes may vary, in the range from less than 1 mm to about 5 mm. The read head preferably is mounted on a parallelogram linkage, by the operation of which the passing envelope may deflect the read head upwards, and the read head still remains in the correct position relative to the window. The task of sensing markings through a transparent pane is a demanding one, and it is recognised that the orientation of the read head to the window is critical. A preferred manner in which the read head may be arranged to accommodate these aspects will be described below.

A still further aspect of the invention provides a print station, where the bars (or other machine-readable markings) are printed on the outside of the envelope, the pattern of the bars being in accordance with the postal code as read by the read sensor.

In the manual system referred to earlier the bars have been applied to the envelope by means of printer hammers activated by solenoids: the operator presses keys in accordance with the code he reads in, and the keys activate the solenoids. Generally, Post offices call for the fluorescent bars to be about 6 mm high and about 1 mm wide, and the designer of the apparatus specifies an appropriate solenoid.

One characteristic of conventional solenoids is that they are comparatively slow-acting, due to the inertia of the (large) armature. The present invention is for use with apparatus with a throughput of two or three envelopes per second, at which speed there is a time interval between fluorescent bars of about 5 milliseconds. For speeds like that, printing by conventional solenoids is unsuitable.

This aspect of the invention provides a means for printing fluorescent bars on an envelope to signify a postal code, wherein the means for printing the fluorescent bars comprises a pair of dot-matrix print heads, which are arranged for printing onto the envelope through a ribbon containing fluorescent ink. In the invention, the print heads are stationary within the apparatus, and are arranged side by side, in line along the direction of travel of the envelope through the apparatus. The two print heads are offset laterally with respect to the direction of travel of the envelope, whereby one print head prints the bottom half of the bar, and the other prints the top half of the bar.

A dot-matrix print head, of the configurations which are commonly available, will only print a bar with a height of about 3 mm. This is the reason two print heads are needed to print a bar 6 mm high. Dot-matrix print heads are not made wider than 3 mm, because dot-matrix print heads are invariably controlled by a computer, and, even where taller printing is needed, it is usually of no great consequence to program the computer to cause the print head to make more than one pass over the paper.

The arrangement of the invention allows conventional dot-matrix print heads to be used, and the invention permits advantage to be taken of their characteristic responsiveness, ease of programming, and well developed reliability.

In conventional dot-matrix printers—the usual application in which dot-matrix print heads are found—only one head is provided, and this one head is driven in motion by a transporter mechanism, which moves the print head at right angles to the motion of the paper.

In the circumstances of the present invention, it would not be practicable to move the envelope laterally (i.e. to move the envelope at right angles to the line of its passage through the apparatus) as it passed through the print station. In the invention, neither the envelopes nor the print heads are required to move laterally. It would indeed be almost impossible to move either a single 3 mm head, or the envelope, laterally fast enough to print a 6 mm high bar. Also, it is recognised that it would be difficult to arrange for the envelope to pass through the print station twice, which is a possibility that might be considered by a designer: it must be considered that, in order to print a 6 mm high bar, it would be possible to pass the envelope twice through a single 3 mm print unit. However, this would drastically reduce throughput, and is not contemplated within this aspect of the invention.

Dot-matrix print heads are computer controlled, and it is recognised in the invention that there is no difficulty in programming the computer to operate the two print heads in correct sequence.

BRIEF DESCRIPTION OF DRAWINGS

By way of further explanation of the invention, an exemplary embodiment of the apparatus of the invention will now be described with reference to the accompanying drawings, in which:

FIG. 1b is a enlarged plan view of an envelope which has been processed in accordance with the method of the FIG. 1a;

FIG. 2 is a side elevation of an apparatus which is assembled and arranged for operation according to the invention;

FIG. 9 is a broken away view of a different form of printing station for use in a further embodiment of the present invention;

DETAILED DESCRIPTION OF PREFERRED EMBODIMENTS

Figure 1A:
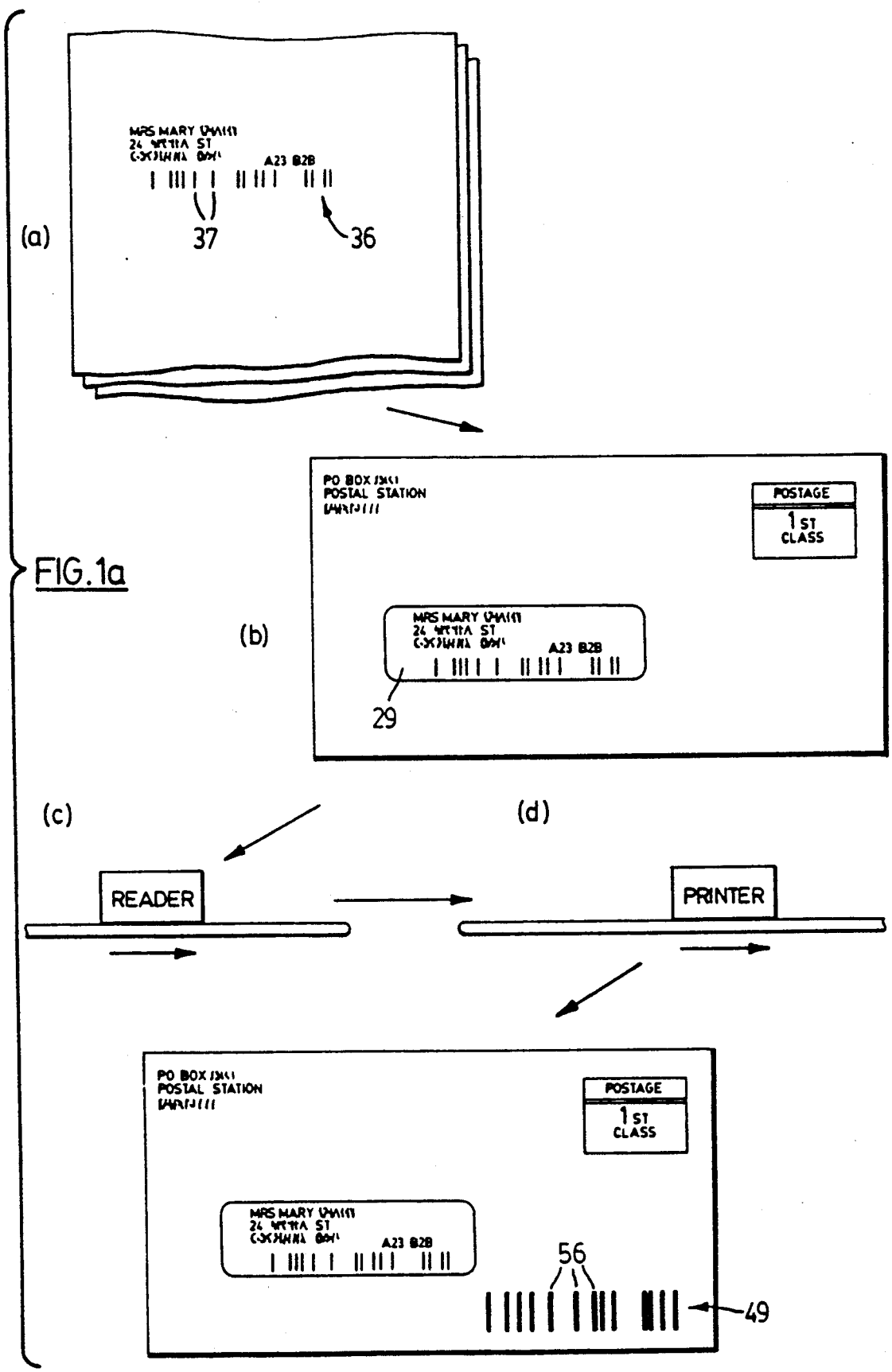
FIG. 1a is an illustration of a method of encoding envelopes in accordance with a first aspect of the present invention.
Figure 1B:
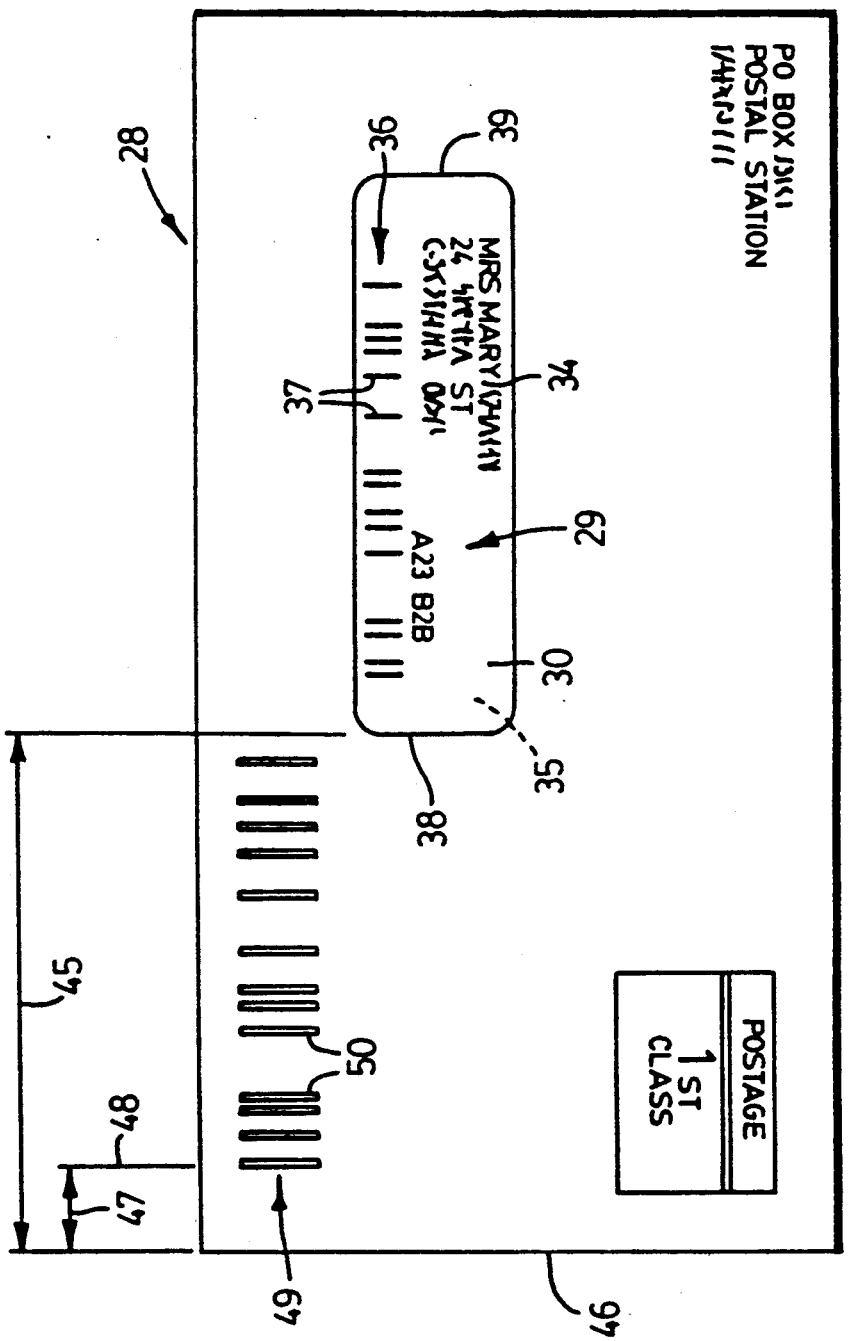

FIG. 1 of the drawings shows a flow chart illustrating the main method steps of the present invention, which is intended for use primarily by those involved in large volume mailing. The invention allows a mailer to mark envelopes or other items of correspondence with a machine readable code which is suitable for reading by the automatic mail sorting apparatus as used by a local, national or regional Post Office. This marking is normally carried out by the Post Office on receipt of the mail from the mailer. Thus, the method and apparatus of the present invention allows the Post Office to eliminate a major processing step on their sorting operation, and this benefit may be passed onto the mailer in the form of a lower postal rate.

The method of a first aspect of the invention involves four basic steps, as illustrated in FIG. 1a as follows:

(a) marking a letter with an easily machine readable first code corresponding to the human readable postal code of the destination address of the letter;

(b) stuffing the letter into a window envelope such that the first code is positioned within the window; and (c) machine reading the first code within the window; and (d) printing a machine readable second code corresponding to the first code and the human readable postal code of the destination address in the location and format utilized by a particular automatic mail sorting apparatus such that the envelope is suitable for processing by the apparatus.

The method will initially be described fairly briefly, followed by a more detailed description of the method and apparatus of the invention.

The machine readable first code takes the form of a series 36 or bars 37 forming a bar code which is printed on the correspondence, in this example a statement, which is printed below the destination name and address at the same time, and with the same typically black ink used to print the destination name and address.

The letter marked in this manner is then stuffed into a window envelope 28, together with any enclosure, using conventional envelope stuffing apparatus, such as the Bell & Howell MAILSTAR (Trademark). The letter is folded and located in the envelope such that the address and the bar code are visible through the window 29.

The stuffed envelope is then conveyed into an encoding apparatus. The encoding apparatus includes a read station, where the first code is read within the window.

The read code is then processed by the apparatus and, when the envelope is conveyed to a print station "downstream" of the read station, the second code is printed on the envelope, the second code corresponding on location, ink and format to that utilised by the particular automatic mail sorting apparatus used by the local Post Office. In the example illustrated, the second code is a series 49 of bars 56 forming a bar code printed in fluorescent ink.

In further embodiments, the first code may be printed on a label or the like, for affixing to the face of an envelope. This method of address and encoding may be particularly appropriate where the enclosures of the envelopes are the same, and there is no need to match particular enclosures with particular addresses.

The methods and apparatus of the invention will now be described in more detail.

The drawings are diagrammatic, and some details of construction have been omitted from the drawings, to enhance the clarity of illustration.

FIG. 2 depicts the overall apparatus. The apparatus includes a fixed base frame 2, which comprises a base plate, pillars, and a lower track frame 3. An upper track frame 4 is, during operation of the apparatus, unitary with the base frame 2, but is openable relative thereto for service purposes.

A lower conveyor belt 5 is driven by a motor (not shown). An upper conveyor belt 7 is spring loaded at several points 8 against the lower conveyor belt 5, the arrangement being such that the two belts are driven in unison. The conveyor assembly may include belt tensioners 9. The arrangement of the conveyor assembly is such that an envelope is caught between the upper and lower belts, and is thereby transported through the apparatus.

The forward ends of the conveyor belts 5, 7 (the right-hand end in FIG. 2) do not extend right to the end of the frame. Thus, the envelope is only picked up between the conveyor belts 5, 7 after the envelope has already traversed some distance into the apparatus. The first portion of the transport of the envelope, upon entering the apparatus, is handled by a pair of pinch rollers 10, 12 of which the lower roller 10 is driven by an electric motor (not shown).

The drive arrangement is that the conveyor belts 5, 7 act as if to transport the envelope at a faster rate than do the pinch rollers 10, 12. No actual slippage occurs, however, and the effect is limited to the creation of an induced tension in the envelope, as it passes from the pinch rollers to the conveyor belts. The read station 16 of the apparatus is so positioned in the apparatus that the portion of the envelope that is being read at the read station is subject to this induced tension.

The read station 16 is described in more detail below. The apparatus also includes a print station 17, which is also described in more detail below.

Figure 3:
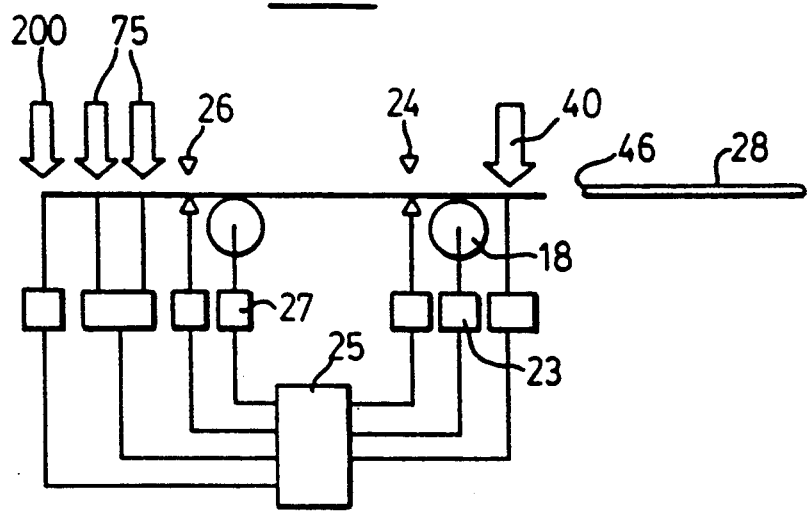
FIG. 3 is a block diagram showing the operative connections between the various components of the apparatus of FIG. 2.
Figure 4:
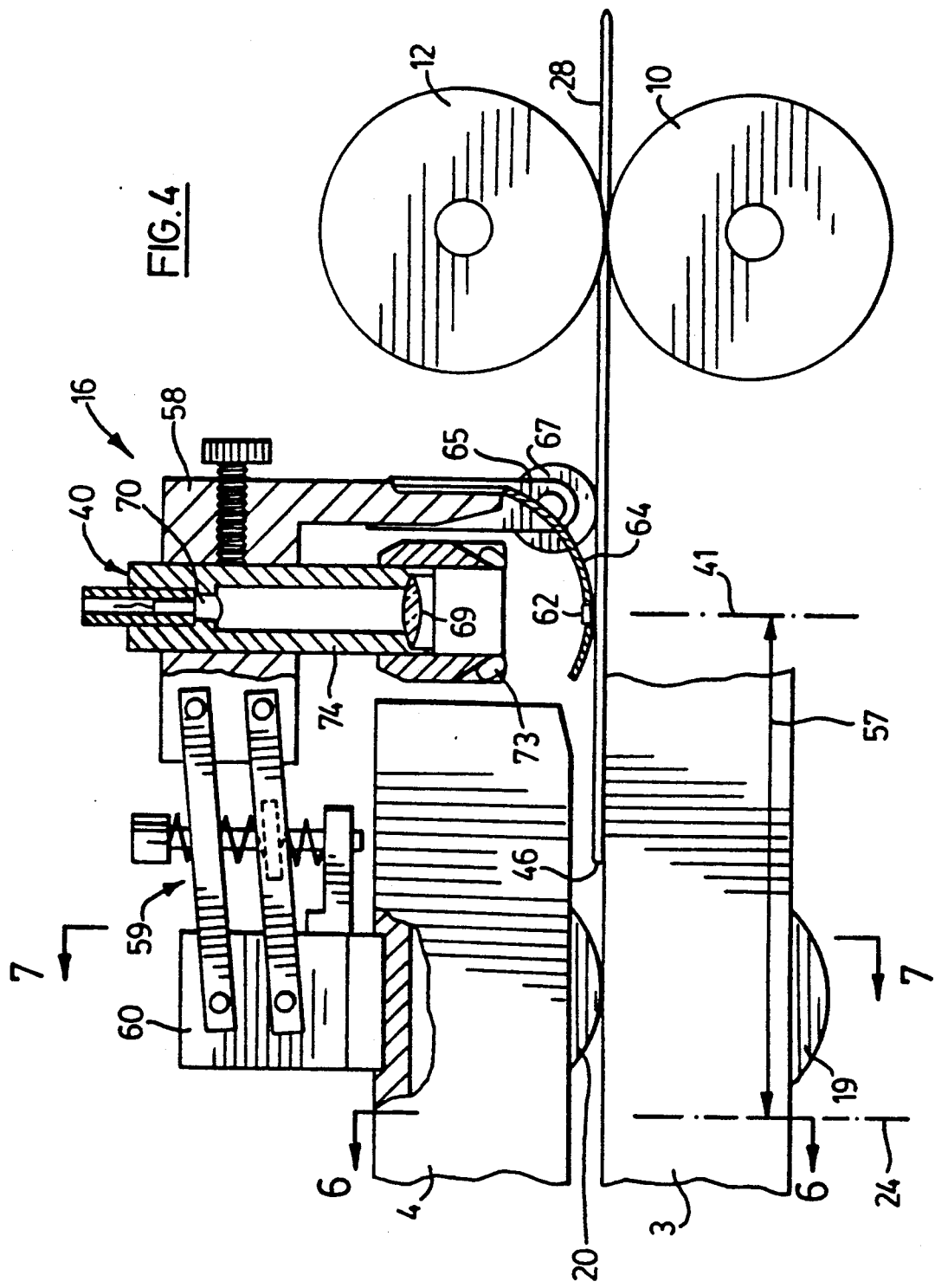
FIG. 4 is a close-up side view of a read station of the apparatus of FIG. 2.
Figure 7:
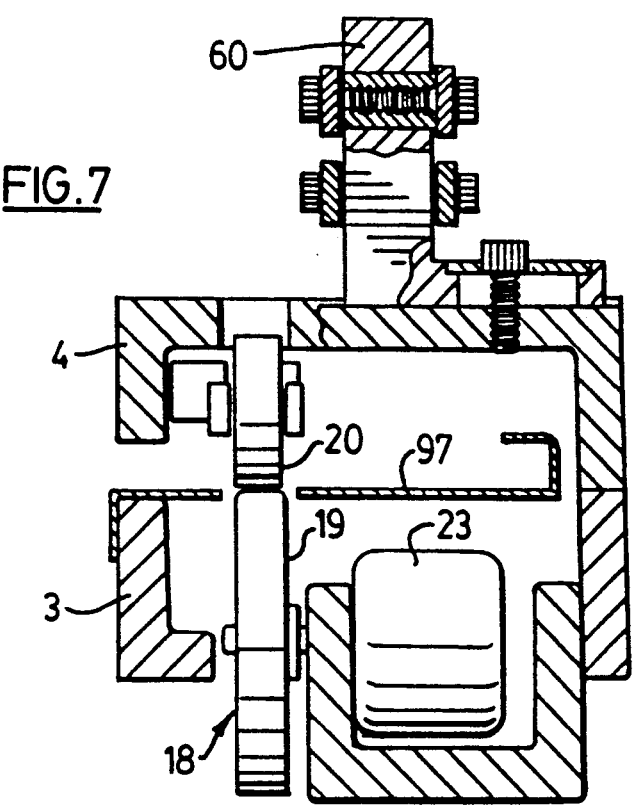
FIG. 7 is a cross-section on line 7—7 of FIG. 4.

Positioned in the lower track frame 3, at the read station 16, is a read-station position-sensor 18, shown schematically in FIG. 3 of the drawings and in some detail in FIG. 4 of the drawings, which comprises a wheel 19, an associated spring-loaded follower 20, and a revolution counter 211 (FIG. 7), such as a SUNX Rotary Shaft Encoder. The arrangement is such that as soon as an envelope passes between the wheel 19 and the follower 20, the wheel 19 starts rotating, the rotary displacement of the wheel 19 being a measure of the linear displacement of the envelope as the envelope is conveyed through the read station. The angular output reading from the counter 23 is therefore a measure of the linear displacement of the envelope with respect to a particular point within the read station.

A photocell 24 (FIG. 3) is incorporated into the track frame 4, for the purpose of detecting the presence of an envelope. During normal operation of the apparatus, when envelopes are passing continuously through the apparatus, the wheel 19 does not stop rotating between envelopes, and in fact, due to its inertia, the wheel barely slows down between envelopes. Therefore, the mere fact that the wheel 19 is revolving cannot be relied upon as the signal than an envelope is present in the station. Instead, the photocell 24 signifies the presence or absence of an envelope passing through the read station 16. A computer 25 is provided in the apparatus, the computer being programmed to start receiving the output from the counter 23 only after the photocell 24 has been activated.

It will be appreciated that the photocell preferably should be so positioned, within the station, that the envelope engages the wheel 19 before the envelope trips the photocell 24, to ensure that the wheel is up to speed and running, before readings from the wheel are fed into the computer.

A similar arrangement is provided in respect of the print station 17. A photocell 26 senses whether an envelope is present at the print station. Again, the computer 25 accepts output from a print-station revolution-counter 27 only when the photocell 26 signifies that an envelope has entered the print station.

Figure 5:
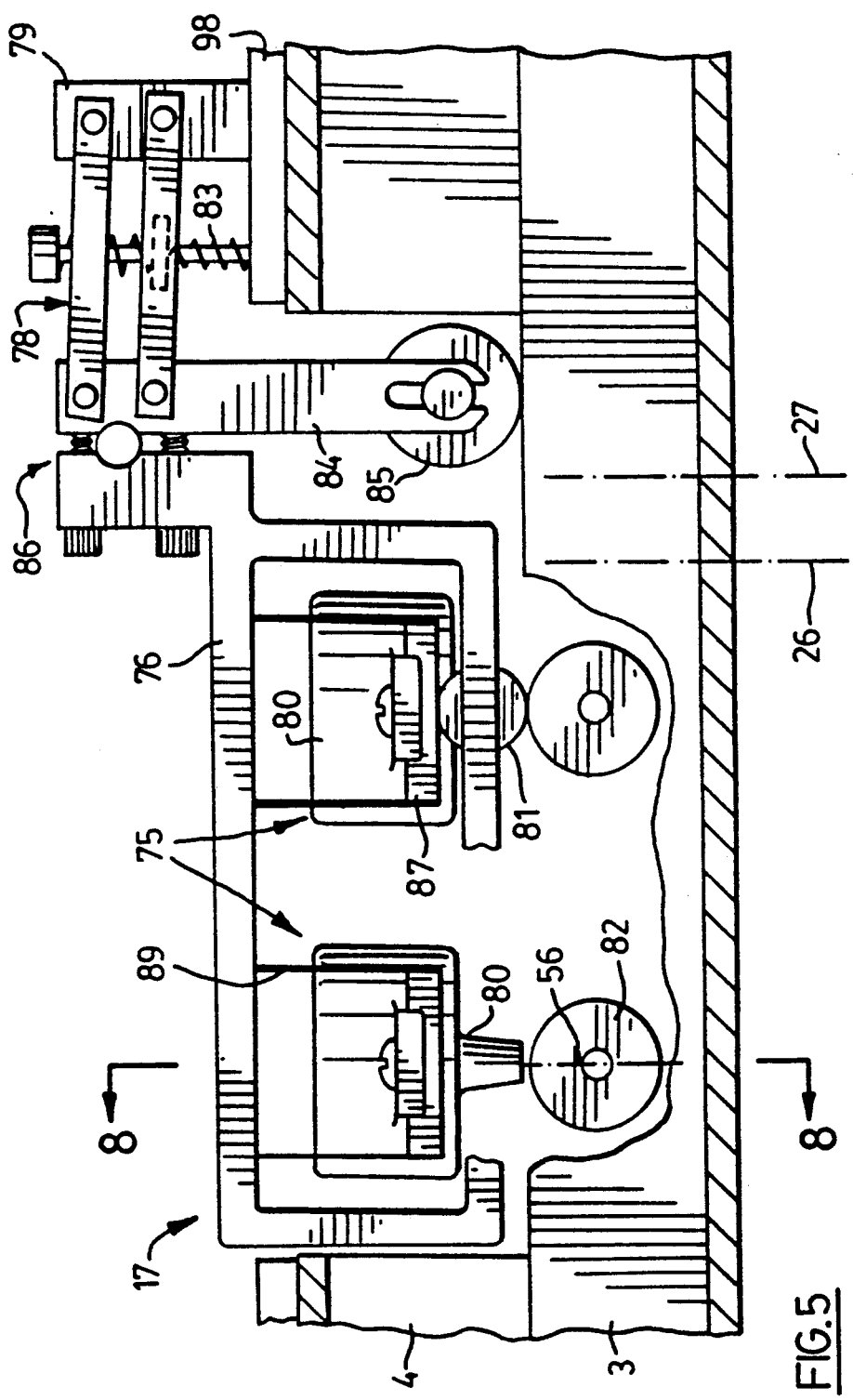
FIG. 5 is a close-up side view of a print station of the apparatus of FIG. 2.
Figure 6:
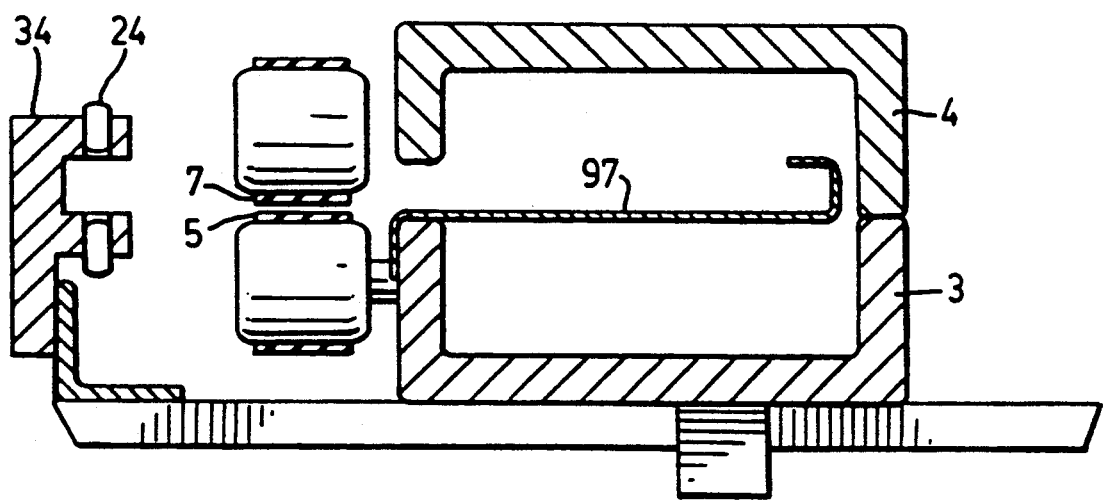
FIG. 6 is a cross-section on line 6—6 of FIG. 4.

The photocells are mounted on a fence 34 (FIG. 6). The fence is adjustable laterally, to accommodate different widths of envelope. The fence, and the photocells, are not shown in FIGS. 4 and 5, for clarity, but their positions are signified by the numerals 24 and 26 thereon.

The envelope 28 (FIG. 2), is of the kind with which the invention is concerned, is provided with a window 29, formed by cutting through the material of the envelope. A pane 30 of the cellophane or other suitable transparent material is glued into the cut-out area.

The conventional arrangement with window envelopes is that a name and address written on an item of correspondence (in this example a credit card statement) 35 placed within the envelope 28 is visible through the window 29. In accordance with the method of the invention, as mentioned above, a series 36 of bars 37 is printed on the statement 35, such that the series 36 also is visible through the window 29. The spacing and layout of the bars 37 is such that the series 36 signifies the appropriate postal code and error-checking verification, preferably in the form of a parity check feature. The bars 37 are printed in ordinary black ink, and are printed on the statement simultaneously with and adjacent to the other personal details and destination address.

It will be described below how the invention enables a read sensor to read the bars 37, through the pane 30, with the required degree of accuracy and sensitivity. One difficulty that should be considered in the reading process is that of making the sensor insensitive to the edges 38, 39 of the window 29—the problem is that the read sensor might detect the edges 38, 39 of the window as if the edges were bars 37. Similarly, the read sensor might detect the edges of the envelope 28 as if they were bars.

The read sensor is signified generally by number 40 and is illustrated in some detail in FIG. 4. The difficulty, on the part of the read sensor 40, of having to detect the difference between a bar 37 and an edge 38, 39 may be avoided in the invention. The computer 25 may be so programmed as to ignore the readings from the read sensor 40 until after the envelope has been displaced a predetermined distance into the read station. Thus, the photocell 24 is used to signify the instant when the envelope 28 enters the read station 16. The output from the read sensor 40 may then be ignored until after the counter 23 has signified that the leading edge 38 of the window 28 has passed a read-line 41. The read-line 41 is the line in the read station 16 at which the sensor 40 actually scans the series 36 of bars.

It cannot be avoided that the item of correspondence 35 must be given a considerable freedom of movement within the envelope 28, in order to allow the use of conventional envelope-stuffing machines. Also, sometimes the envelopes will be stuffed with ancillary items of correspondence, but sometimes the envelopes will contain only the bare statement on its own, and the dimensions of the statement and the envelope must be acceptable for both cases. Therefore, it cannot be avoided that the first of the bars 37 in the series 36 might sometimes be as close as, say, 3 mm to the leading code 38, and on other occasions the first of the bars might be 20 mm behind the leading edge. Similarly, in the lateral sense, the position of the bars 37 on one occasion may be laterally displaced by as much as 10 mm from the position of the bars on another occasion. By the same token, the series 36 may lie at an angle relative to the direction of motion of the envelope.

On the other hand, there is little difficulty in manufacturing the envelope to reasonably tight tolerances, whereby the distance 45 from the leading edge 46 of the envelope to the leading edge 38 of the window may be expected not to vary by more than about 1 mm. The result is that the photocell 24, which is activated very reliably by the edge 46 of the envelope, can be used to signify with adequate accuracy the moment at which the leading edge of the envelope passes the photocell, and therefore to signify, by simple addition of preset accurately-known distances, the moment at which the leading edge 38 of the window clears the read-line 41. Once that moment is past, the computer 25 can be allowed to start to process the readings from the sensor 40.

As mentioned earlier, the invention may be applied to the case where the series 36 of bars is printed on a stick-on mailing label, rather than on an item of correspondence to be read through a window: the same problem arises, with a label, that the edges of the label might be mistaken for coded markings. As the invention uses the position of the window or label as the means for indicating to the computer whether the signal from the read head should be, or should not be, ignored, any extra positional tolerance requirement detracts directly from the margin over which the read head can operate accurately. Thus it would be important in a "label" application that the label be positioned accurately on the envelope.

The series 36 of bars 37 maybe set so as always to contain a set number of bars, in which case, the computer can be programmed to look for exactly that number, and then to ignore any further signals. However, it is preferred in the invention that the computer be programmed so that the processing of signals from the counter continues only for a given displacement of the envelope after the start of processing, that is, that the signal upon which the computer stops processing the output of the read sensor is simply that the envelope has travelled a given preset distance since the computer started processing the output of the read sensor. Under this procedure, it is not possible that the trailing edge 39 of the window could be detected as if it were a bar 37, and also under this procedure there is no requirement that all the unique series 36 of bars in all the passing envelopes should have the same number of bars.

Figure 8:
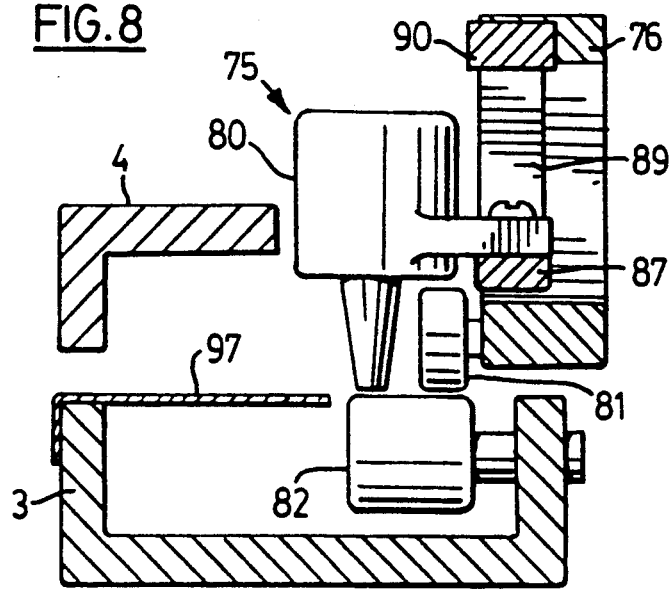
FIG. 8 is a cross-section on line 8—8 of FIG. 5.

As regards printing the markings on the envelopes, the general rule is that Post Offices specify the distance 47 it requires between the leading edge 46 of the envelope and the start point 48 of the series 49 of typically fluorescent markings 50. The instant at which the envelope 28 enters the print station 17 is signalled to the computer by the print-station photocell 26; the computer can be programmed to start the printing process as soon as the envelope has travelled a predetermined distance after that.

it may be noted that the distance specified by the Post Office between the leading edge 46 of the envelope (i.e. that edge that activates the photocell 26), and the point at which the series 49 is to start, will in most jurisdictions be always the same, irrespective of the size of the envelope. Therefore, the print station photocell 26 may remain at a fixed site relative to the print-line 56 at the print station (FIG. 8). In contrast, it will be recalled that the photocell 24 in the read station 16 is adjustably movable relative to the read-line 41, to cater for the possibility that the windows 28 of one batch of envelopes might lie at a different distance from the leading edge 46 of the envelope than the windows of another batch. Of course, if the need arises, the position of the photocell 26 at the print station may similarly be made adjustable.

It should be noted that it would be inadvisable to allow just one photocell to be used to control the operational starting points of both stations, since the distance 45 between the leading edge of the window and the leading edge of the envelope changes more often than, and independently of, the distance 47 between the start of the series 49 and the leading edge of the envelope.

It is possible to provide adjustability for the various operating points at the stations either by the preferred method of moving the read-station photocell or alteratively by re-programming the computer, when adjustment is required, to respond to a new value for a measured displacement. It is recognised in the invention that the former is much easier than the latter—all the technician in charge of the setting the apparatus needs to do is to make sure that he follows this rule: that he sets the distance 57 of the photocell 24 from the read-line 41 to be equal to the distance 45 from the leading edge of the envelope to the leading edge of the window (plus C, where C is an apparatus-dependent constant dimension). As mentioned, the technician does not need to re-position the corresponding photocell 26 at the print station 17 for each size of envelope, because the distance 47 between the leading edge of the envelope and the start-point 48 of the fluorescent markings produced at the print station will generally always be required to be constant.

The construction and operation of the read sensor 40 will now be described, with particular reference to FIG. 4 of the drawings.

The read sensor 40 includes a housing 58, attached to a parallelogram linkage 59, by which the housing is guided for up/down movement. The parallelogram linkage is mounted from a block 60 secured to the upper track frame 4.

Attached to the housing 58 is a springy slipper 64, which of such dimensions as to engage resiliently against the top surface of an envelope 28 passing beneath the read sensor 40. The housing 58 also includes a pair of legs 65, each having a ball-bearing 67 mounted at its foot. The bearings 67 also engage the top surface of the envelope, but there is substantially no resilience between the bearings 67 and the housing 58.

A suspension unit 68 is provided in connection with the parallelogram linkage 59, the purpose of the suspension unit 68 being to act in conjunction with the weight of the housing 58 to produce the desired downwards force on the envelope.

The housing 58 contains a lens 69 and an optical-sensor or photo-detector 70 such as a Silicon Photo-Darlington Transistor. The housing also contains floodlights 73. The lens 69 and detector 70 are mounted in a focusing tube 74, which can be moved vertically within the housing 58, and can be locked to the height at which the detector is focused on the envelope.

To assist in focusing, the detector 70 may be removed from the tube 74 and replaced temporarily with a standardised light source. A spot of light from the source would then appear on a test sheet placed under the sensor, and the height of the tube 74 can be adjusted until that spot is focused.

When an envelope 28 enters the read station 16, the leading edge 46 of the envelope strikes the ball bearing 67, thereby urging the housing 58 upwards and onto the envelope. In other apparatus, the ball bearing 67 may be omitted, if desired, such that the weight of the housing 58 is supported solely by the slippers. The springy slipper 64 presses lightly down onto the envelope. The main purpose of the springy slipper is to smooth out the pane 30, in order firstly to smooth out any wrinkles that might tend to be present in the pane, and secondly to ensure that the pane is in direct contact with the paper of the statement 35.

The function of the slipper 64 is in fact critical to the accurate operation of the apparatus. A wrinkle in the pane 30 might not appear to be significant to a person, because the eye ignores it, but the photodetector 70 will all too easily detect a wrinkle as if the wrinkle were one of the bars 37. Therefore, the pane preferably should be perfectly smooth and flat. No leas important is the requirement to ensure that the pane 30 is pressed into firm contact with the paper beneath as read-sensing is taking place: if the pane 30 were to be even slightly clear of the paper below, the resulting scattering of light could produce false readings.

The suspension unit 68 therefore should be such that the combined effect of the weight of the housing and the action of the spring within the unit 68 provides a firm engagement action. The force of engagement should not be too strong, however, or the envelope might tend to be distorted. Such distortion would, it if happened, interfere with the smooth passage of the envelope through the read station, and one of the aims of the invention is to create as little resistance as possible to the motion of the envelope, since such interference would limit the rate of throughput.

Glare and reflections from the transparent material of the pane 30 can be troublesome if not properly dealt with, either producing a false indication that a bar is present, or preventing a bar from being detected. The springy slipper 64 consequently is provided with only a small hole 62, so that only a small portion of the potentially glare-producing pane is exposed during the reading. The inside of the focusing tube 74 is blackened, as is the upper surface of the slipper 64, to minimize glare. The floodlights 73 are set at an angle, to minimize spurious reflections from the window and the surface of the paper.

The parallelogram linkage 59 is important in achieving the desired degree of accuracy in the performance of the sensor. It might be considered that the housing 58 could be mounted on a single pivoting arm, as distinct from the two parallel arms as shown, and such an arrangement is contemplated. However, the position of the pivot-point of such a notional single arm upon the frame 4 would be critical: if the pivot point were too high, the arcuate operational movement of the arm would mean that as the housing 58 swung upwards the housing would also be slightly displaced horizontally forwards relative to the hole 62 in the slipper. If the pivot-point were a substantial distance above the envelope, such an error might not be negligible. Such an effect might be alleviated if the pivot-point were low down, at or near the level of the envelope, or if the arm were long, but there is little room in the apparatus for these measures to be taken, especially since there is generally a requirement also that the read sensor 40 be adjustable as to its lateral position, to cater for the window not always in the same lateral position on the envelope.

In the preferred parallelogram arrangement, the pivot-points between the block 60 and the linkage 59 are, as shown, quite high above the envelope, and the linkage is quite short, yet substantially no fore-aft motion accompanies the up/down motion of the housing.

The envelope thickness can vary in the range of about 1-5 mm. The suspension unit 68 is adjustable, and it is usually desirable for the technician to adjust the setting of the suspension unit 68 in accordance with the nominal thickness of a particular run of envelopes; the distance through which the housing 58 is called upon to rise, as the envelope passes beneath, is thereby kept to a minimum. The block 60 tends to bounce upwards only very slightly, as the envelope passes beneath, when the suspension unit 68 is set correctly.

Preferably, the two legs 65 and their ball-bearings 67 should be spaced sufficiently widely apart, laterally, that the bearings are well clear of the pane.

The block 60 is slidable in the lateral sense in a groove in the upper track frame 4, for adjusting the sensor in accordance with the location of the window 29 upon the envelope 28. Such a lateral adjustment facility is enhanced by virtue of the fact that the sensor 40 is located ahead of the belts 5, 7.

The first code contains a number of bars indicative of the postal code and also a parity check feature: a count is made of the "postal code" bars of the first code and a number of further bars printed in the code such that a count of all of the bars in the code is of a selected first parity. Thus, a correct first code, as presented to the read head, should have this selected first parity. If, on reading the first code, a count of the bars of the first code reveals the code is of a different second parity, this is detected by the computer 25 and a command is sent to "hold" the printer and a signal sent to downstream envelope reject apparatus to reject the incorrectly coded envelope, that is, no second code is printed on the envelope and the envelope is rejected. The envelope can then be manually re-fed. In testing of the apparatus rejects at this stage are about five per thousand envelopes processed, and usually caused by a poor stuff.

The construction and operation of the print station 17 (FIG. 5) will now be described.

At the print station 17, two print heads 75 are provided. These are mounted in a carriage 76, which is mounted on a parallelogram linkage 78 for up/down movement relative to a block 79. The block 79 is fixed to the upper track frame 4.

Each print head 75 includes a dot-matrix print unit 80. This print unit is a conventional proprietary item, such as a Epson LX800, and will not be described in detail. Such units are readily obtainable either with nine or twenty-four pins. Positioned alongside the print unit 80, and on the same print-line 56, a roller-follower 81 is provided, the axle of which is fixed firmly to the carriage 76. Both the print unit 80 and the roller-follower 81 are arranged to bear onto a strike-roller 82, the axle of which is fixed firmly to the lower track frame 3.

A ribbon 94 is threaded underneath the print unit 75. The ribbon 94 contains ink to be detected by the particular automatic mail sorting apparatus used by the Post Office, and is typically fluorescent, black or other colour ink, and is mounted in a conventional ribbon-carrying cartridge 95. The ribbon is continuously circulated by means of a motor 96. (The ribbon has been omitted in FIGS. 5 and 8).

The weight of the carriage 76, with the print heads 75 attached, is partially supported on an adjustable spring unit 83. A leg 84 and attached bearing 85 assembly is provided, which is similar to that described in respect of the read-sensor 40, and which also takes a portion of the weight of the carriage. Thus the total weight of the carriage is divided between four points of support: the two roller followers 81, the bearings 85, and the spring unit 83. In addition, when the print heads 75 are being actuated, the actuation forces on the pins in the two print heads are reacted against the weight of the carriage. In other embodiments, the bearing 85 may be omitted.

Of these, of course, the actuation forces of the pins are the most important; and in fact the other weight controlling supports are arranged so that the actuation forces of the pins can be controlled with the correct degree of sensitivity and responsiveness.

When an envelope 28, travelling along the tray 97, enters the print station 17 (from the right, FIG. 5), the leading edge 46 of the envelope engages the bearing 85, driving the leg 84 upwards, and raising the carriage 76. The parallelogram linkage 78 ensures that the carriage remains horizontal during the upwards motion, and remains so while the envelope passes beneath the carriage. It is desirable that the two print heads 75 be both positioned at exactly the same height above the passing envelope, and this requirement applies even though the thickness of the envelopes may vary. An angle setting means 86 is included as part of the carriage, and operates in combination with the parallelogram linkage 78, whereby the angle of the carriage can be adjusted relative to the linkage. The purpose of the leg and its bearing is to raise the carriage well before the printing operation actually starts: after its sudden rise, which may be accompanied by momentary bouncing, the carriage then has time to settle down gently to its correct level, well before printing commences.

The print pins in the print heads 75 are, as mentioned, arranged so as to strike the envelope, reacting against the strike-roller 82. The envelopes pass the print head at speeds in the region of 50 cm/sec. Print heads were developed for use in dot matrix printers, wherein the print head moves much more slowly relative to the paper during printing; and one of the features of the invention is the recognition that a dot-matrix print head can be used in a manner which is so different from that for which it was developed. To accommodate the high relative speed, steps are taken to allow the print head to move slightly with the passing envelope during the moment the pins are striking the envelope, as will now be described.

As shown in FIG. 8, the print unit 80 is bolted solidly to a rail 87. The rail 87 in turn is bolted between a pair of thin springy arms 89, which depend downwardly from a block 90 which is bolted to the carriage 76. The effect of this arrangement is that the print head 75 has some "give", and can move (slightly) in the direction of travel of the envelope. The fact also that the reaction-roller 82 is moving with the envelope, but is providing a solid base against which the pins can strike, gives a very advantageous manner of printing. It may be noted that exceptional clarity of printing is not required, and indeed the individual dots preferably are allowed to merge into each other, but the amount of smudging does need to be controlled to ensure that each fluorescent bar 50 is clearly delineated.

The bars 50 typically have a width or thickness as produced by five pin-strikes. Thus, to produce a bar 50, the pins are actuated five times—when nine pins are provided, the pins would alternate in a 5-4-5-4-5 sequence.

As mentioned, the reason two print heads 75 are provided is that proprietary dot-matrix print heads are normally only 3 mm high, whereas the fluorescent bar 50 is required to be 6 mm high. The two print heads are offset the 3 mm difference. Thus, the first print head prints the bottom halves of the bars 50, and the second print head prints the top halves of the bars. Naturally, it is important that the two halves of the bars match up exactly, and suitable inter-adjustment means (not shown) is provided.

Provided downstream of the print station 17 may be a verification reader 200 (FIGS. 2 and 3), which may take any convenient form and which reads the bars printed by the print heads. The signal obtained by the reader is compared with the input data to the printer. If there is an error in the printed code, a signal is sent to the computer 25 to notify an envelope reject apparatus downstream of the reader 200 to reject the incorrectly coded envelope. This feature serves as a quality assurance feature for detection and immediate action to reject an envelope or stop processing if the fault is caused by for example, a faulty print head, printer ribbon, or mechanical problem in the transport or displacement measurement.

As stated above, the read sensor 40 is designed to be adjustable laterally, because the position of the window can vary. The print heads 75, on the other hand, do not need to be adjustable laterally, because the fluorescent bars are required always to be the same distance from the edge of the envelope.

The requirements of different Post Offices may cause the fluorescent bars to be at different places, but again, once the apparatus has been designed for a given positioning of the fluorescent bars, the print heads would remain in that position. It is unlikely that an apparatus would need to be built to cater for the requirements of more than one Post Office, but such adjustment could be provided if desired.

The apparatus shown in the drawings can be easily serviced, because of its construction. The upper track frame 4 is able to pivot about the conveyor belt drive pulley 99. Upon release of a suitable catch (not shown) the upper track frame 4 may be swung upwards, together with all the components attached to it, including the upper conveyor belt 5, and the read and print stations 16, 17. As a further aid to servicing, the print station 17 is mounted on a mounting plate 98, which during operation is locked down to the upper track frame 4, but which can swing upwards, for servicing, about an axis parallel to the direction of travel of the envelope, with respect to the upper track frame.

The modular construction of the apparatus is apparent. Most of the components are designed to be held in place by a single bolt.

As regards the spacing of the fluorescent bars 50, this can be the same as the spacing of the ink bars 37; alteratively the coded pattern of the bars 50 may be different from that of the bars 37. Preferably, the spacing is smaller for the first code; between $\frac{1}{4}$ and $\frac{1}{2}$ inch spacing is desirable between the right window edge and the first bar, to allow for enclosure movement and clearing of the window edge signal, and the last bar should be spaced from the left window edge. In conventional window envelopes these requirements will normally require the first code to be "compressed" relative to the second code.

Figure 10:
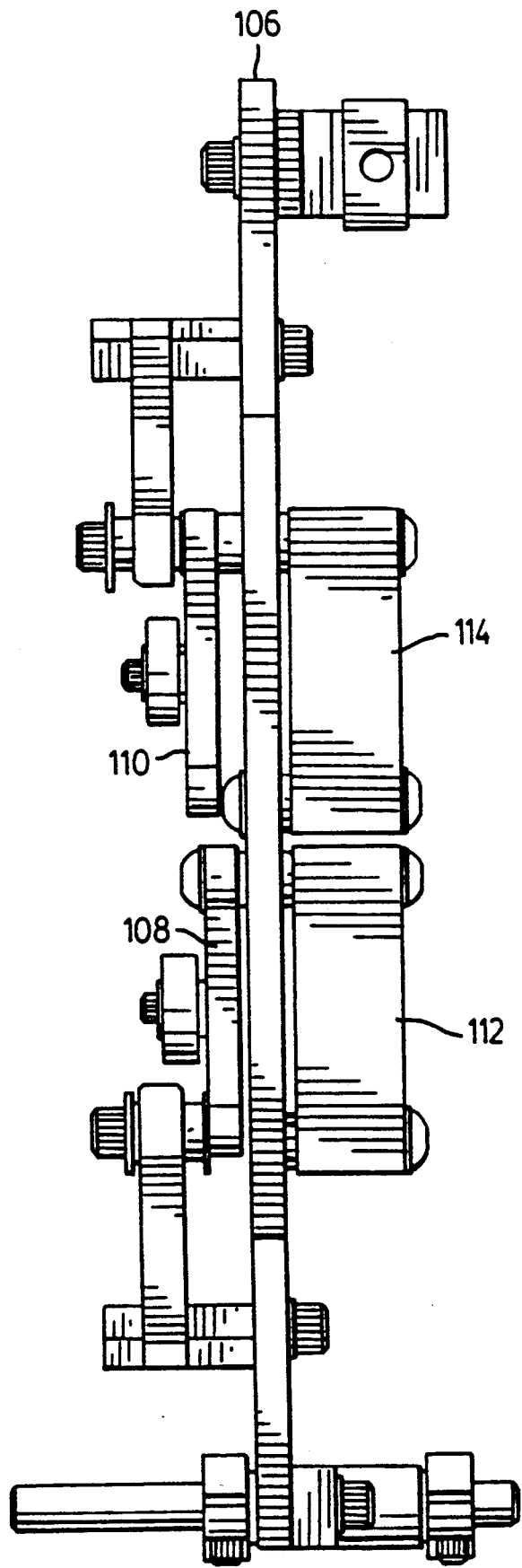
FIG. 10 is a plan view from above of the printing station of FIG. 9.
Figure 11:
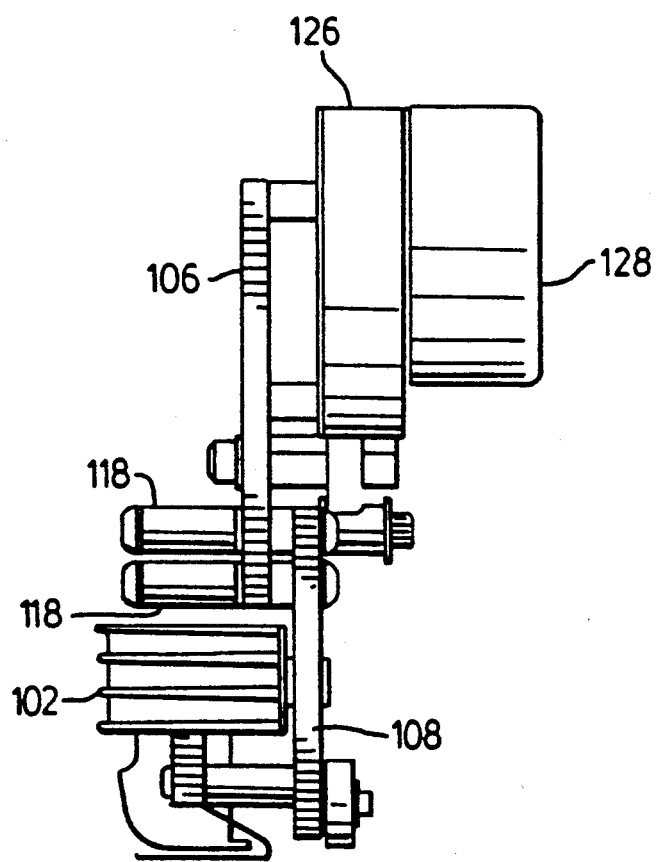
FIG. 11 is an end view of the printing station of FIG. 9.

FIGS. 8 through 10 illustrate a somewhat different print station 100, for use with apparatus in accordance with another aspect of the present invention. The print station 100 is provided with two print heads 102, (only one shown in FIGS. 8 and 10, and no print head shown in FIG. 9), which are separately mounted on a carriage in the form of a printer plate 106. Each print head 102 is mounted on a respective U-shaped printhead plate 108, 100. Each plate 108, 110 is mounted to the printer plate 106 through a parallelogram linkage for up/down movement relative to the plate 106. Each linkage comprises a pair of pivot arms 112, 114.

The arms 112, 114 are mounted to the plate 106 by stationary pivot posts 116, 118. Posts 120, 122 extend from the other ends of the arms 112, 114 in front of the plate 106 (as viewed in FIG. 8) to the rear of the plate 106 and one arm of the respective print head plate 108, 110. The other arm of each plate 108, 110 is provided with a post which acts as a spring spacer 120, 122. The springs 124 acting on the spacer 122 are formed of flat strips of steel and extend from spring mounts 125 on the printer plate 106. The springs are arranged such that an upper spring 124a resists upward movement of the plate 108, 110, and thus also the print head, while the lower spring 124b damps downward movement.

The printer cartridge (not shown) is mounted on the front of the print plate 106 and is driven through a coupling 126 and electric motor 126 mounted on the rear of the plate 106.

The plate 106 is mounted on the apparatus frame through an adjustable pivot mount 129 at one end of the plate 106, and is provided with an adjustable bearing portion 130.

The print heads 102, 104 of this embodiment operate similarly to the print heads described above.

An alternative construction contemplated in the invention is that the read and print heads are positioned beneath the tray, in the lower track frame, and act upwards. This arrangement would have the benefit that the read and print heads could remain stationary as the envelope passed: roller followers mounted in the upper track frame could move to accommodate the thickness of the passing envelope. Although the construction of the read and print stations would therefore be simplified, such an arrangement is not preferred because in that arrangement the envelopes would travel face down: other postal machinery requires the envelopes to be face up, so that inverters would be needed.

Another alternative, in which the passing envelopes are face up, is to arrange that the envelopes pass underneath the tray, and are pressed upwards into contact with the tray. Again, this measure would avoid the need for the read and print heads to float, but the difficulty now is that the ideal agency—i.e. gravity—for holding the envelopes in position on the tray would not be available.

The conventional dot-matrix print heads as mentioned will only print a height of about 3 mm, which is why two print heads are provided in the preferred embodiment. However, an alternative arrangement is contemplated in the invention wherein the pins in the print head are operatively engaged with a relatively wide strike-bar. In this arrangement, when the pins are actuated, the motion of the pins is transmitted mechanically to the strike bar, which then strikes through the ribbon onto the envelope. In that case only one print head would be required, but a disadvantage lies in the fact that the extra inertia of the strike-bar would slow the speed and responsiveness of the print action.

We claim:

1. A method of encoding correspondence bearing a human readable postal code to facilitate routing of the correspondence to a destination address by automatic mail sorting apparatus adapted to use a particular location and format for the destination address, said method comprising the steps:
   (a) marking a letter with an easily machine readable first code, said first code being generated from and corresponding to the human readable postal code of the destination address;
   (b) stuffing the letter into a window envelope such that the first code is positioned within the window;
   (c) machine reading the first code within the window;
   (d) printing a machine readable second code corresponding to the first code in the human readable postal code of the destination address in the location and format utilized by the particular automatic mail sorting apparatus such that the envelope is suitable for processing by the apparatus.

2. The method of claim 1, wherein the first code is a bar code.

3. The method of claim 1, wherein said first code includes a parity element providing a parity check for indicating a valid first code and wherein, said parity element is checked in step (c) when reading the first code and if the parity element of the machine read first code on an envelope is invalid, a reject signal is generated for identifying the envelope for later separation from the envelopes bearing valid first codes.

4. The method of claim 1, wherein the first and second codes are generated using the same encoding and printing format.

5. The method of claim 1, wherein the reading of the first code and the printing of the second code are carried out as the envelope and letter are carried along an envelope path by a conveyor through a reading and printing apparatus.

6. The method of claim 1, wherein the first code is printed on the letter in conventional black ink simultaneously with the destination address.

7. The method of claim 1, wherein the second code is printed on the envelope in fluorescent ink.

8. The method of claim 1, wherein the second code is printed by a pair of dot matrix printers, one printer printing a lower portion of the code, and the second printer printing an upper portion of the code.

9. The method of claim 1, wherein the first code is marked on the letter in a location proximate to the destination address.

10. The method of claim 1, wherein the first code is read by an optical sensor, which is effective to produce a series of electrical signals in accordance with said code, which signals are arranged into a sequence of spaced pulses, and the second code is printed by a printer in the form of spaced apart marks in sequence in accordance with the pulses originating from the optical sensor.

11. The method of claim 10, wherein the displacement of envelopes on the envelope path is monitored and is transduced into electrical signals corresponding to the displacement of the envelopes and these electrical signals are correlated with the electrical signals from the optical sensor.

12. The method of claim 11, wherein processing of the electrical signals generated by the optical sensor are disabled until after the leading edge of the window of an envelope has passed the optical sensor.

13. The method of claim 1, wherein the portion of the window through which the first code is read is pressed against the letter during reading of the code.

14. A method of encoding correspondence bearing a human readable postal code to facilitate routing of the correspondence to a destination address by automatic mail sorting apparatus, said method comprising the steps:
   (a) marking a piece of mail with an easily machine readable first code, said first code being generated from and corresponding to the human readable postal code of the destination address;
   (b) machine reading the first code; and
   (c) printing a machine readable second code corresponding to the first code and the human readable postal code of the destination address in a location and format utilized by the particular automatic mail sorting apparatus.

15. An apparatus for printing coding markings on an envelope, in accordance with machine readable pre-printed marks relating to a human readable destination address on an item of correspondence, said apparatus comprising:
   (a) a read station and a print station, and a conveyor for transporting the envelope there between, along a conveyor line;
   (b) means for determining displacement of the envelope along said conveyor line and for producing signals indicative of said displacement;
   (c) said read station including an optical sensor, which is effective to produce a series of electrical signals in response to reading the machine readable pre-printed marks;
   (d) computing means coupled to said read and print stations, which accepts said signals of displacement of the envelope through said stations and controls said read and print stations;
   (e) means for transmitting said electrical signals from said optical sensor to the computing means;
   (f) means for producing a sequence of spaced pulses from said electrical signals, said computing means transmitting said pulses to said print station;
   (g) said print station including at least one signal-control printer, which, during normal operation of the apparatus, remains at a fixed print-point at said print station;
   (h) and said printer being effective to print a marking on the envelope as the envelope passes said print-point, and to print a series of such marking son the passing envelope in spaced-apart sequence in accordance with said pulses received from said computing means;
   (i) said means for determining displacement of the envelope including a print station displacement counter at said print station, and a read station displacement counter at said read station, each of said displacement counters being coupled to said computing means and generating said signal indicative of the displacement of a passing envelope relative to each respective station, and said computing means utilizing said displacements for controlling said read and print stations;
   (j) each of said displacement counters comprising a transducer, said transducers producing said signals corresponding to the displacement of a passing envelope, and said computing means including means for correlating said displacement signals with said electrical signals received from said optical sensor, the correlation such as to insure that the spacing and positioning of the coding marking sprinted by said printer correspond to the pre-printed marks as read by said optical sensor;

(k) wherein the envelope has a window, and the pre-printed marks are upon the item of correspondence readable through the window, and the window has a leading edge; and (l) the apparatus includes means for disabling said electrical signals produced by said optical sensor, in respect of a particular passing envelope, until after the leading edge of the window of that envelope has passed said optical sensor.

16. An apparatus for printing coding markings on an envelope in accordance with machine readable pre-printed marks relating to a human readable destination address on an item of correspondence, said apparatus comprising:

(a) a read station and a print station, and a conveyor for transporting the envelope there between, along a conveyor line;

(b) means for determining displacement of the envelope along said conveyor line means and for producing signals indicative of said displacement;

(c) said read station including an optical sensor, which is effective to produce a series of electrical signals in response to reading the machine readable pre-printed marks;

(d) computing means coupled to said read and print stations, which accepts said signals of displacement of the envelope through the stations, and controls said read and print stations;

(e) means for transmitting said electrical signals from said optical sensor to said computing means;

(f) means for generating a sequence of spaced pulses from said electrical signals and said computing means transmitting said pulses to said print station;

(g) said print station including at least one signal-control printer, which, during normal operation of the apparatus, remains at a fixed print-point at said print station;

(h) said printer being effective to print a marking on the envelope as the envelope passes said print-point, and to print a series of such markings on the passing envelope in spaced-apart sequence in accordance with the pulses received from said computing means;

(i) wherein the envelope has a window and the window includes a pane of transparent material, through which the pre-printed marks are readable;

(j) during normal operation of the apparatus, said optical sensor remains at a read point at said read station the read point being fixed in the longitudinal sense relative to said conveyor line;

(k) said read station includes means for compressing a zone of the pane of transparent material against the item of correspondence; and (l) said compressed zone comprises at least that portion of the pane that lies momentarily at the read point as the envelope passes the read point.

17. Apparatus of claim 16, wherein:

said means for compressing the read zone comprises a resilient slipper, which is mounted for engagement directly with the pane;

the resilient slipper comprises a length of springy sheet material;

and the material is curved, the convex side of the curve being in engagement directly with the pane.

18. Apparatus of claim 17, wherein:

said slipper is provided with a hole, through which the markings on the correspondence are visible to said optical sensor;

and the hole is, in substance, small, whereby glare and reflections from the pane are minimized.

19. An apparatus for printing coding markings on an envelope in accordance with machine readable pre-printed marks relating to a human readable destination address on an time of correspondence, said apparatus comprising:

(a) a read station and a print station, and a conveyor for transporting the envelope there between, along conveyor line;

(b) means for determining displacement of the envelope along said conveyor lien and for producing signals indicative of said displacement;

(c) said read station including an optical sensor, which is effective to produce a series of electrical signals in response to reading the machine readable pre-printed marks;

(d) computing means coupled to said read and print stations, which accepts said signals of displacement of the envelope through said stations, and controls said read and print stations;

(e) means for transmitting said electrical signals from said optical sensor to said computing means;

(f) means for producing a sequence of spaced pulses from said electrical signals, said computing means transmitting said pulses to said print station;

(g) said print station including at least one signal-control printer, which, during normal operation of the apparatus, remains at a fixed print-point at said print station;

(h) said printer being effective to print a marking on the envelope as the envelope passes said print-point, and to print a series of such markings on the passing envelope in spaced-apart sequence in accordance with the pulses received from said computing means;

(i) wherein the apparatus includes a fixed conveyor trays, the arrangement being such that as the envelope runs on the tray, the pre-printed marks facing upwards;

(j) said optical sensor is positioned above the tray;

(k) the apparatus includes means for mounting said optical sensor for up/down movement; and (l) the apparatus includes means for raising said optical sensor, said means for raising being operatively responsive to the presence of an envelope passing along the tray.

20. Apparatus of claim 19, wherein:

said means for raising said optical sensor includes a bearing means which is engageable with the passing envelope;

the bearing means is, in substance, rigid with respect to the optical sensor;

the bearing means is so positioned in the apparatus that the optical sensor is raised by the passing envelope well before the said margins pass under the optical sensor.

21. Apparatus of claim 19, wherein said means for mounting the optical sensor includes means for aligning the optical sensor at a constant vertical orientation independent of any upward and downward movement.

22. Apparatus of claim 21, wherein said means for aligning the optical sensor comprises a parallelogram linkage.

23. An apparatus for printing coding marking son an envelope in accordance with machine readable pre-printed marks relating to a human readable destination address on an item of correspondence, said apparatus comprising:
- (a) a read station and a print station, and a conveyor for transporting the envelope there between, along a conveyor line;
- (b) means for determining displacement of the envelope along said conveyor line and for producing signals indicative of said displacement;
- (c) said read station including an optical sensor, which is effective to produce a series of electrical signals in response to reading the machine readable pre-printed marks;
- (d) computing means coupled to said read and print stations, which accepts said signal of displacement of the envelope through said stations and controls said read and print stations;
- (e) means for transmitting said electrical signals from said optical sensor to said computing means;
- (f) means for producing a sequence of spaced pulses from said electrical signal, said computing means transmitting said pulses to said print station;
- (g) said print station including at least on signal-control printer, which, during normal operation of the apparatus, remains at a fixed print-point at said print station;
- (h) said printer being effective to print a marking on the envelope as the envelope passes said print-point, and to print a series of such markings on the passing envelope in spaced-apart sequence in accordance with the pulses received from said computing means;
- (i) means for applying tension to the passing envelope, as the envelope passes through said read station;
- (j) said means for applying tension comprising two separate drive means for conveying the envelope through the apparatus, positioned on leading and one trailing with respect to said read station, said leading drive means being operated at a slower speed than said trailing drive means.

* * * * *